US010576002B1

(12) United States Patent
Stottlemyer

(10) Patent No.: US 10,576,002 B1
(45) Date of Patent: Mar. 3, 2020

(54) WIRELESS ADJUSTABLE WHEELCHAIR HEADREST

(71) Applicant: Kyle Evan Stottlemyer, Destin, FL (US)

(72) Inventor: Kyle Evan Stottlemyer, Destin, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/038,270

(22) Filed: Jul. 18, 2018

Related U.S. Application Data

(63) Continuation of application No. 15/257,438, filed on Sep. 6, 2016, now Pat. No. 10,052,248.

(60) Provisional application No. 62/214,585, filed on Sep. 4, 2015.

(51) Int. Cl.
*G05B 11/01* (2006.01)
*A61G 5/12* (2006.01)

(52) U.S. Cl.
CPC ................ *A61G 5/12* (2013.01); *A61G 5/121* (2016.11); *A61G 2203/10* (2013.01)

(58) Field of Classification Search
CPC .................................. A61G 5/12; B60N 2/002
USPC .......................................................... 318/560
See application file for complete search history.

(56) References Cited

U.S. PATENT DOCUMENTS 5,003,240 A * 3/1991 Ikeda .................... B60N 2/874 318/603
5,074,574 A 12/1991 Carwin
5,107,716 A 4/1992 Torii et al.
5,791,735 A * 8/1998 Helman ................ A61G 5/121 297/404
5,967,613 A 10/1999 McKeever
7,588,115 B2 9/2009 Breed
2006/0250016 A1* 11/2006 Wang .................... B60N 2/002 297/408

(Continued)

OTHER PUBLICATIONS

Bluetooth controlled servo motor using Arduino accessed on Oct. 4, 2016 at http://www.instructables.com/id/How-to-control-servo-motor-from-android-app/, Controlling of a servo motor using Bluetooth and an Android app or IPhone app is already widely available and put into use more commonly in many applications.

*Primary Examiner* — Erick D Glass
(74) *Attorney, Agent, or Firm* — Smith & Hopen, P.A.; Steven M. Forte; Nicholas Pfeifer

(57) ABSTRACT

An adjustable wheelchair headrest system to provide wheelchair users with the ability to control their headrest without assistance form another individual. Some wheelchair users are unable to adjust their headrests without assistance, and as a result, have no control over their head and neck positioning throughout the day. The system provides wheelchair users with a multi-directional adjustable headrest that may be controlled through a mobile device. The system includes a universal mounting system and manually adjustable starting positions for each linear translation and rotational assembly, which allows the system to easily mount to any existing wheelchair. The system enables users to adjust their headrest to suit any situation (driving, watching a movie, eating, etc.). Wheelchair reliant individuals can now enjoy day-to-day comfort, control their own upper body posture, and perform additional tasks without assistance.

20 Claims, 11 Drawing Sheets

(56) References Cited

U.S. PATENT DOCUMENTS

| | | | | |
|---|---|---|---|---|
| 2014/0203611 | A1 | 7/2014 | Kondrad et al. | |
| 2015/0061873 | A1 | 3/2015 | Hyde et al. | |
| 2015/0130248 | A1* | 5/2015 | Line | B60N 2/865<br>297/410 |
| 2015/0145296 | A1 | 5/2015 | Hotary et al. | |

* cited by examiner

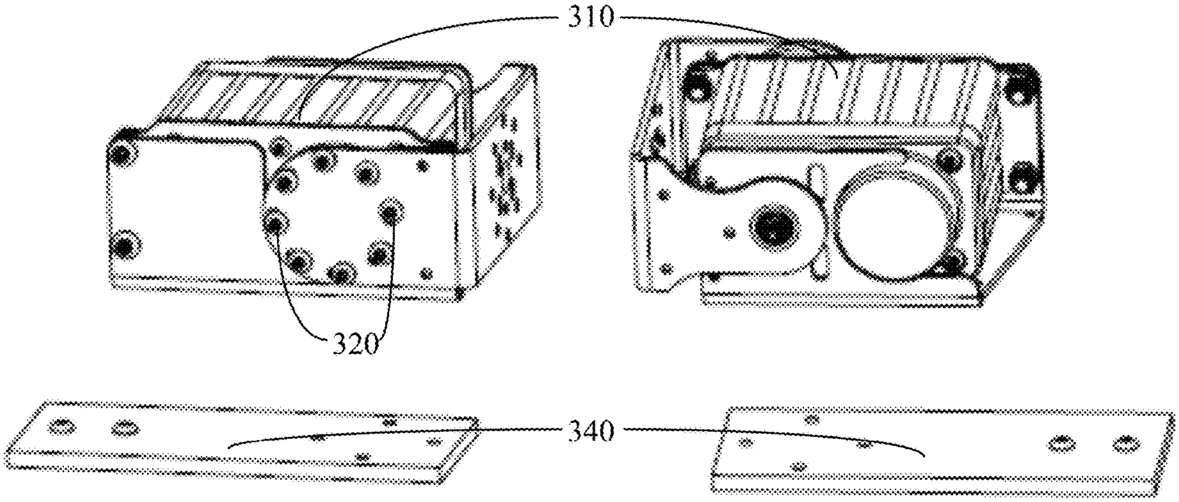
FIG. 2A
FIG. 2B
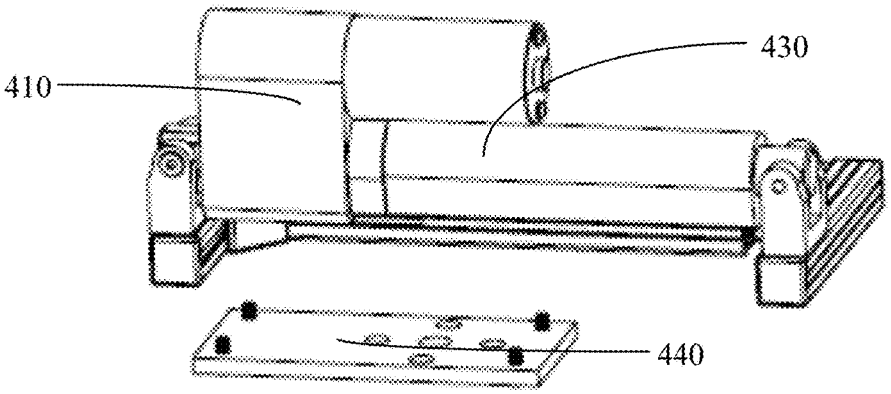
FIG. 2C
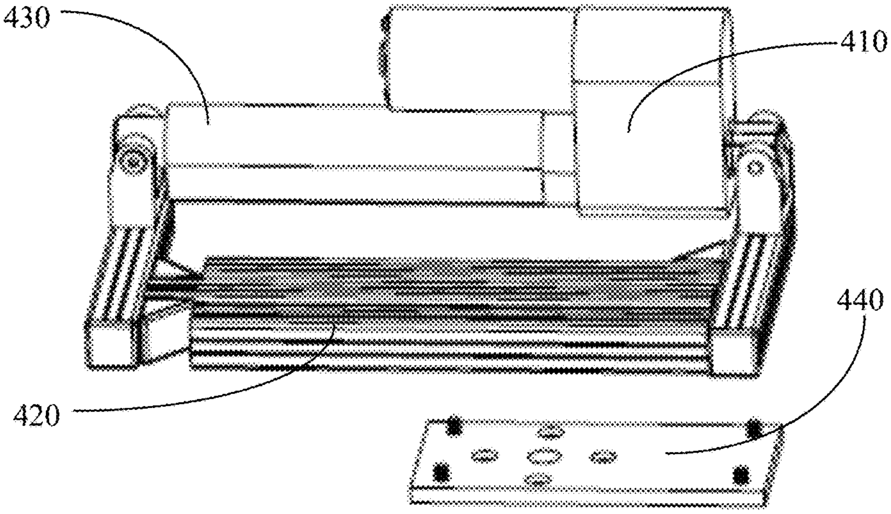
FIG. 2D

WIRELESS ADJUSTABLE WHEELCHAIR HEADREST

CROSS-REFERENCE TO RELATED APPLICATIONS

This nonprovisional application claims priority to U.S. Nonprovisional patent application Ser. No. 15/257,438, entitled "Wireless Adjustable Wheelchair Headrest," filed on Sep. 6, 2016 by the same inventor, which claims priority to U.S. Provisional Patent Application No. 62/214,585, entitled "Wireless Adjustable Wheelchair Headrest," filed on Sep. 4, 2015 by the same inventor, the entirety of which is incorporated herein by reference.

BACKGROUND OF THE INVENTION

1. Field of the Invention

This invention relates, generally, to a wheelchair headrest control.

2. Brief Description of the Prior Art

Wheelchairs were designed to provide certain individuals with greater mobility. Many of the individuals in powered wheelchairs have serious limitations in the use and mobility of their arms and upper torso. Typically, these individuals are unable to adjust their wheelchair's headrest without assistance. As a result, individuals without immediate assistance have no control over the positioning of their own head and neck throughout the day. This can lead to pressures on the skin that result in sores as well as uncomfortable and inconvenient head and neck positions. Currently, wheelchair designs have failed to address this shortcoming.

Accordingly, what is needed is a motorized adjustable wheelchair headrest manually adjustable to alter the position of the headrest. Additionally, there is a need for a motorized adjustable wheel chair headrest configured to be universally mounted to any wheelchair. However, in view of the art considered as a whole at the time the present invention was made, it was not obvious to those of ordinary skill in the field of this invention how the shortcomings of the prior art could be overcome.

Currently, there are similar devices, however, these similar devices fail to teach or suggest a motorized adjustable wheelchair headrest in communication with a mobile device adapted to control the position of the headrest and universal attachment ability to any wheelchair.

One such devices is disclosed in, U.S. Pat. No. 5,074,574. This patent teaches an attachable wheelchair headrest that can be positioned at any desired height as well as the headrest having the ability to rotate about a horizontal axis. However, this patent only teaches manual adjustment of the headrest and does not teach rotation of the headrest about a vertical axis.

Another similar device is disclosed in U.S. Pat. No. 5,791,735. This patent teaches an attachment wheelchair headrest, back pad, side pads, and a mounting assembly. The rotation of the wheelchair headrest, back pad, and side pads to be about a vertical axis so as to add support for a user's spinal column. However, this patent only teaches manual adjustment of the device and does not teach rotation about a horizontal axis.

Yet another device is disclosed in U.S. Pat. No. 5,967,613. This patent teaches an adjustable upper torso and head support positioning system that fits to most standard wheelchairs. The disclosure teaches that the head support can be adjusted horizontally and vertically as well as rotated about the horizontal and vertical axes. However, this patent only teaches manual adjustment of the head support.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a wireless adjustable wheelchair headrest that provides wireless motorized, electronic adjustability as well as manual adjustability and a universally attachable mounting plate is now met by a new, useful, and nonobvious invention.

The novel device includes an adjustable headrest system attachable to the back of a chair. A headrest is moved by one or more linear translation assemblies and one or more rotational assemblies. Each linear translation assembly includes a linear translation mechanical actuator, such as a servo motor. The linear translation mechanical actuator is adapted to provide adjustment to the headrest back and forth in a specified linear direction. Each rotational assembly includes a rotational mechanical actuator, such as a servo motor. The rotational mechanical actuator is adapted to provide adjustment to the headrest rotationally around a specified axis. The adjustable headrest system further includes an actuator controller. The actuator controller is in communication with one or more linear translation assembly and one or more rotational assembly. The adjustable headrest system further includes an electrical connection. The electrical connection extends to the chair's power source or to a detachable power source that is configured to attach to the adjustable headrest system.

The actuator controller may be enabled to wirelessly interface with an application on a mobile device, wireless remote, handheld computer device or any other controlling device known to a person of ordinary skill in the art that may be controlled by the individual using the wheelchair. The application may provide a graphic interface which enables the user to adjust the exact position of the headrest. The application may further include one or more preset position of the headrest to allow for individual customization of the adjustable headrest system.

The adjustable headrest system may further include a universally attachable mounting plate. An embodiment of the mounting plate uses a two-bolt design for ease of attachment to the back of a chair.

Each of the linear translation assemblies and rotational assemblies are adapted to manually adjust their starting positions with respect to the rest of the adjustable headrest system. As a result, the headrest can be adjusted in the respective specified linear direction of each linear translation assembly and rotationally around the respective specified axis of each rotational assembly.

In an embodiment, the headrest is moved by a vertical linear translation assembly, a first horizontal linear translation assembly, a pitch rotational assembly and a yaw rotational assembly. The vertical linear translation assembly includes a vertical linear mechanical actuator which is adapted to adjust the height of the headrest. The first horizontal linear translation assembly includes a horizontal linear mechanical actuator which is adapted to adjust the location of the headrest in a horizontal direction in line with the forward-facing headrest. The pitch rotational assembly includes a pitch rotational mechanical actuator which is adapted to adjust the pitch of the headrest. The yaw rotational assembly includes a yaw rotational mechanical actuator which is adapted to adjust the yaw of the headrest. An actuator controller is in communication with the vertical linear mechanical actuator, the first horizontal linear mechanical actuator, the pitch rotational mechanical actuator and the yaw rotational mechanical actuator. The actuator controller is in wireless communication with a mobile device, wireless remote, handheld computer device or any other controlling device configured to communicate with the actuator controller.

The adjustable headrest system may include a second horizontal linear translation assembly. The second horizontal linear translation assembly includes a horizontal linear mechanical actuator which is adapted to adjust the location of the headrest in a horizontal direction perpendicular with the forward-facing headrest. The actuator controller is in communication with the second horizontal linear mechanical actuator.

The adjustable headrest system may include a roll rotational assembly. The roll rotational assembly includes a roll rotational mechanical actuator which is adapted to adjust the roll of the headrest. The actuator controller is in communication with the roll rotational mechanical actuator.

The adjustable headrest system may include a universally attachable mounting plate which attaches to the back of a chair by means of a two-bolt system. Furthermore, the vertical linear translation assembly, first horizontal linear translation assembly, pitch rotational assembly and yaw rotational assembly may be adapted to adjust manually to a customized starting position. Vertical linear translation assembly may be adapted to adjust in the vertical direction based upon the headrest user's preference of the starting position height of the headrest. First horizontal translation assembly may be adapted to adjust manually in the horizontal direction in line with the forward-facing headrest based upon the headrest user's preference of the starting position of the headrest in the horizontal direction in line with the forward-facing headrest. The pitch rotational assembly may be adapted to adjust manually the pitch of the headrest based upon the headrest user's preference of the headrest's starting pitch position. The yaw rotational assembly may be adapted to adjust manually the yaw of the headrest based upon the headrest user's preference of the headrest's starting yaw position.

In an embodiment, the device is an adjustable wheelchair headrest system for attaching to the back of a wheelchair. The adjustable wheelchair headrest system includes a headrest in communication with a vertical linear translation assembly, a first horizontal linear translation assembly, a second horizontal linear translation assembly, a pitch rotational assembly, a yaw rotational assembly and a roll rotational assembly. The second horizontal linear translation assembly includes a second horizontal linear mechanical actuator which is adapted to adjust the location of the headrest in a horizontal direction perpendicular to the forward-facing headrest. The roll rotational assembly includes a roll rotational mechanical actuator which is adapted to adjust the roll of the headrest.

Furthermore, the vertical linear translation assembly, first horizontal linear translation assembly, second horizontal linear translation assembly, pitch rotational assembly, yaw rotational assembly and roll rotational assembly are adapted to adjust manually to a customized starting position. Second horizontal translation assembly is adapted to adjust manually in the horizontal direction perpendicular with the forward-facing headrest based upon the headrest user's preference of the starting position in that direction. The roll rotational assembly is adapted to adjust manually the roll of the headrest based upon the headrest user's preference of the headrest's starting roll position.

BRIEF DESCRIPTION OF THE DRAWINGS

For a fuller understanding of the invention, reference should be made to the following detailed description, taken in connection with the accompanying drawings, in which:

FIG. 2A depicts a left side view of an embodiment of the pitch rotational assembly, including the pitch rotational mechanical actuator, the manual adjustment starting position bolt apertures on the pitch rotational assembly, and the pitch to horizontal connector plate.

FIG. 2B depicts a right side view of an embodiment of the pitch rotational assembly, including the pitch rotational mechanical actuator and the pitch to horizontal connector plate.

FIG. 2C depicts a left side view of an embodiment of the horizontal linear mechanical actuator attached to the horizontal linear piston and the horizontal to yaw connector plate.

FIG. 2D depicts a right side view of an embodiment of the horizontal linear mechanical actuator attached to the horizontal linear piston, the horizontal slider track, and the horizontal to yaw connector plate.

DETAILED DESCRIPTION OF THE INVENTION

Figure 1A:
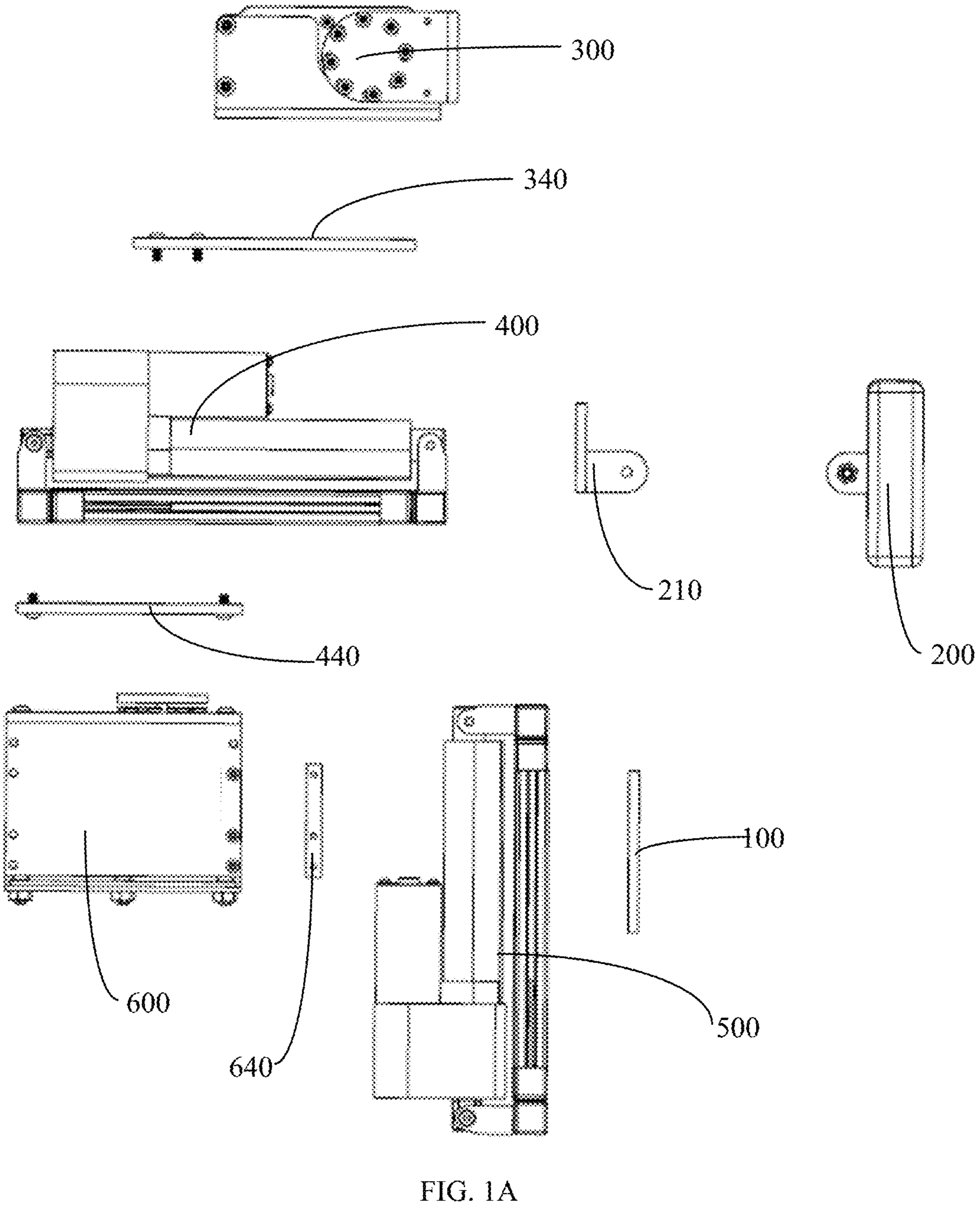
FIG. 1A depicts a left side exploded view of an embodiment of the wireless adjustable wheelchair headrest.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The present invention includes a wireless adjustable wheelchair headrest that can be configured to attach to any chair or wheelchair and adjusted, both manually and by the use of mechanical actuators, such as servo motors, to conform to the needs of any headrest user. The invention will be described and illustrated herein as applied to a wheelchair, but it can be understood how the device can be easily mounted to other types of chairs as well.

The device has a universally mountable plate ("mounting plate") which preferably attaches to the system using a two-bolt approach. In the event that a different mounting plate is required, the two-bolts are easily removed, and the required mounting plate can attach to the device. The variability of the mounting plate allows the system to easily and removably attach to virtually any powered wheelchair. In addition, a user may easily transfer the system to a different wheelchair.

The device further includes one or more linear translation assemblies. Each linear translation assembly includes a linear mechanical actuator, such as a servo motor, which provides motion along a slider track. Each linear translation assembly is positioned to translate the headrest in a vertical direction, in a horizontal direction in line with the headrest's forward position, or in a horizontal direction perpendicular to the headrest's forward position. The device may include only one linear translation assemblies, a combination of any two linear translation assemblies, or all three linear translation assemblies described above.

Each linear translation assembly may include manually adjustable starting locations for the mechanical actuators and their slider tracks. The vertical linear translation assembly may be manually placed in one of a plurality of positions on the assembly such that the starting position of the headrest can be adjusted higher or lower, depending on the user's specific needs. A horizontal linear translation assembly may be manually placed in the direction in line with the headrest's forward position such that the starting position of the headrest can be adjusted in any position forward towards the user or backward away from the user. A horizontal linear translation assembly may be manually placed in the direction perpendicular to the headrest's forward position such that the starting position of the headrest can be adjusted any position to the left of center of the wheelchair or to the right of center of the wheelchair.

The device also includes one or more rotational assemblies. Each rotational assembly includes a rotational mechanical actuator, such as a servo motor, actuator. A pitch rotational assembly is positioned to provide motion of the headrest around a first horizontal axis of rotation, the first horizontal axis of rotation being an axis perpendicular to the headrest's forward position. A yaw rotational assembly is positioned to provide motion of the headrest around a vertical axis of rotation. A roll rotational assembly is positioned to provide motion of the headrest around a second horizontal axis of rotation, the second horizontal axis of rotation being an axis along the headrest's forward position. The device may include only one rotational assembly, a combination of any two rotational assemblies, or all three rotational assemblies described above.

Each rotational assembly may include adjustable starting locations for the mechanical actuators and their respective rotational axes. The pitch rotational assembly, yaw rotational assembly, and roll rotational assembly all may be manually placed by attaching to brackets or mounting plates attached to one or more bolt holes.

The variable starting positions of each mechanical actuator results in a completely customizable system and allows the adjustable headrest system to be easily attached to any wheelchair design.

The device further includes an actuator controller in communication with the mechanical actuators. The actuator controller enables the user of the wheelchair to manipulate the position of the headrest without assistance from another individual. Furthermore, the actuator controller may have one or more predefined starting positions of the headrest that is customized for a specific user. Upon choosing this predefined starting position on the actuator controller, the mechanical actuators will move the headrest into the user's predefined starting position. In an embodiment, the actuator controller is wirelessly controlled using an application on a mobile device through known methods of radio communication. In another embodiment, the actuator controller is wired into the device.

In the wireless embodiment, each mechanical actuator includes wireless communication capabilities and the actuator controller may be a mobile device, wireless remote, handheld computer device or any other controlling device known to a person of ordinary skill in the art. The user interface of the actuator controller may provide graphic representations of the headrest and headrest movements. In addition, the user interface may control each mechanical actuator individually or collectively at the same time.

The device may include a 12-volt direct source, derive power from the wheelchair's existing power source, or some combination thereof. In an embodiment, the device contains a separate 12-volt power source that attaches to the wheelchair or directly onto the system. In another embodiment, the device is connected to the wheelchair's existing power source and the mechanical actuators and actuator controller are powered exclusively through the wheelchair's existing power source. In yet another embodiment, the mechanical actuators are connected and powered through the wheelchair's existing power source and the device is powered through a separate 12-volt power source.

Figure 1B:
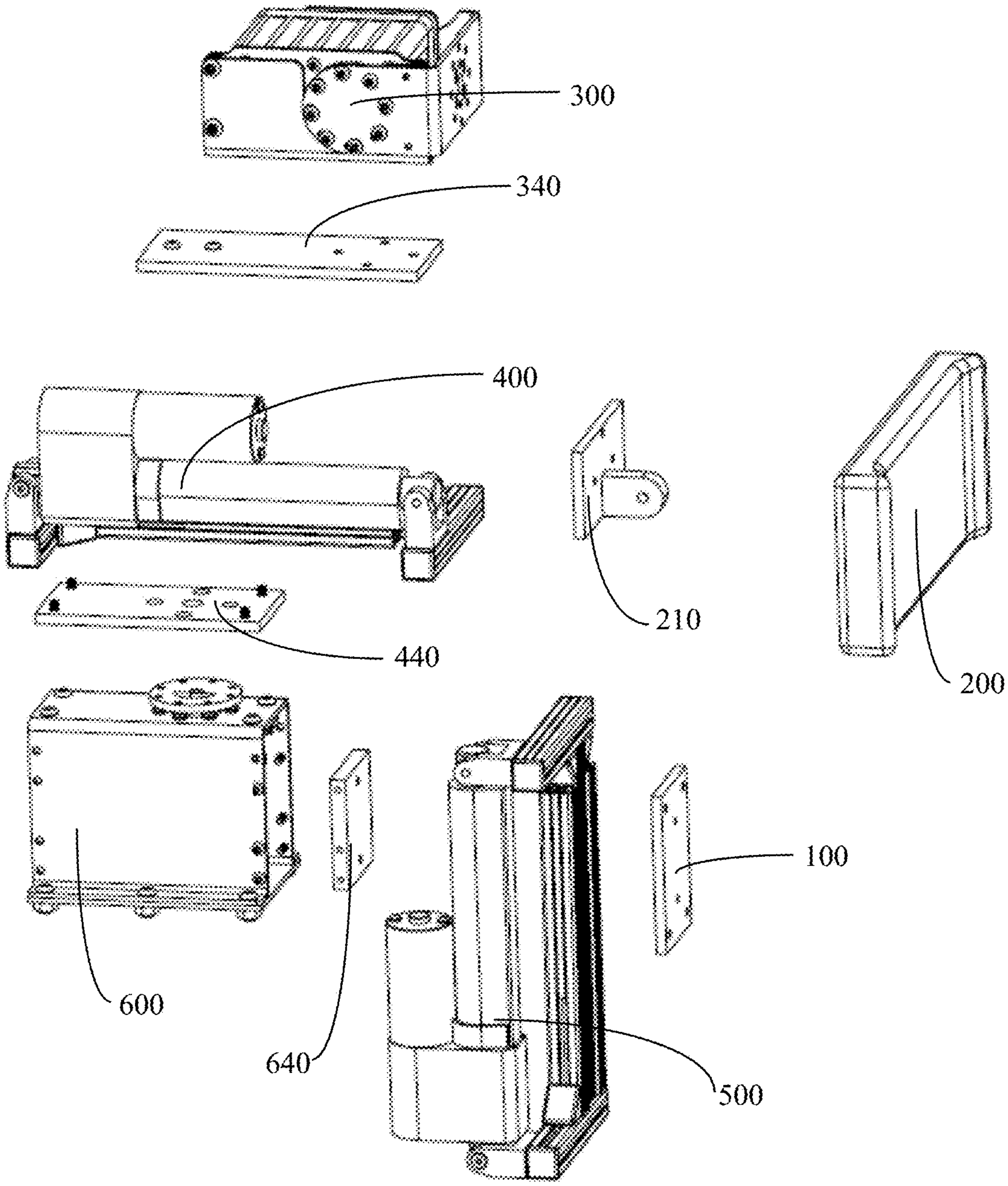
FIG. 1B depicts an angled left side exploded view of an embodiment of the wireless adjustable wheelchair headrest.
Figure 1C:
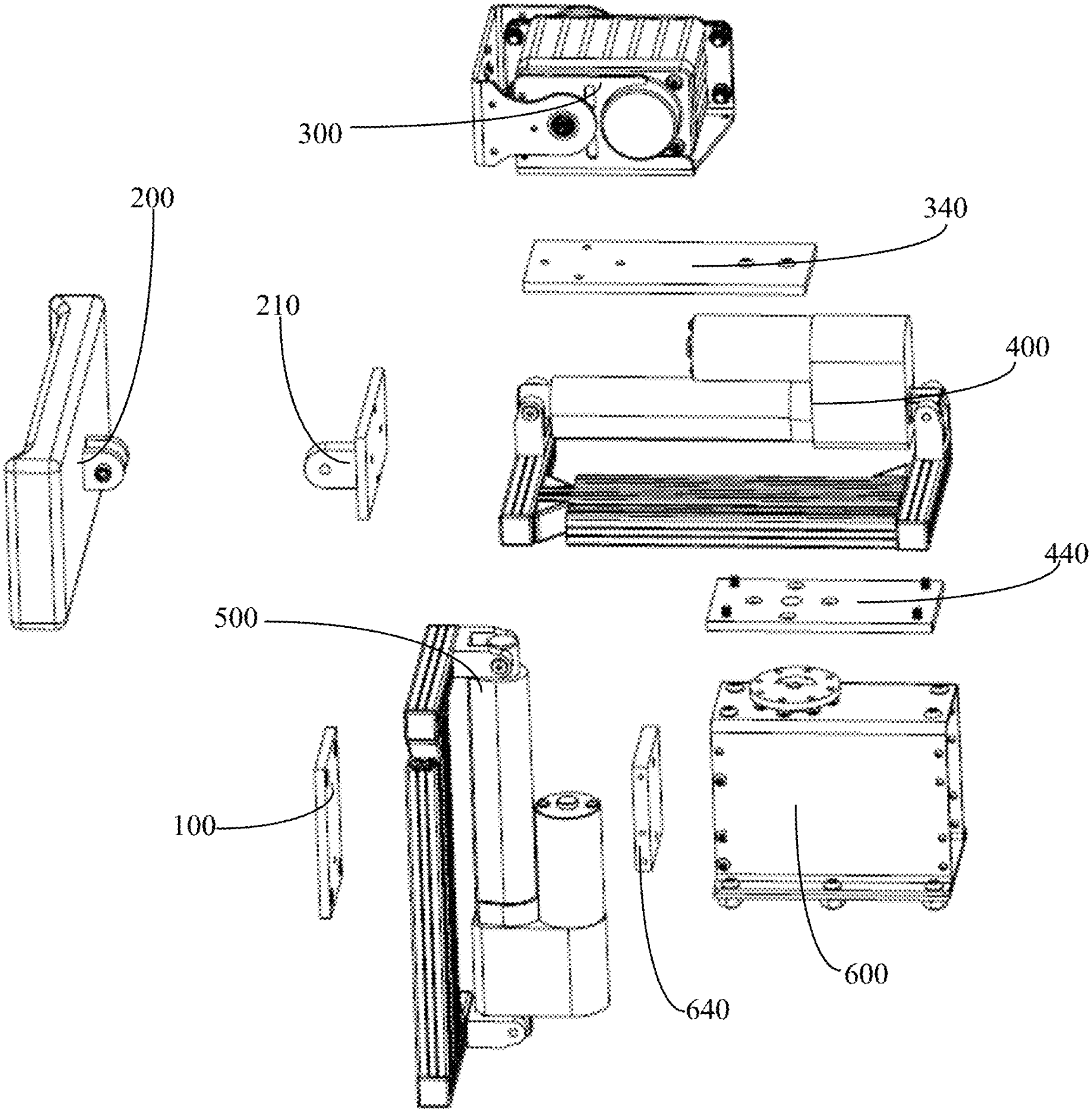
FIG. 1C depicts an angled right side exploded view of an embodiment of the wireless adjustable wheelchair headrest.

In FIG. 1A-C an exploded view of an embodiment of the device is shown. This embodiment shows two linear translation assemblies and two rotational assemblies. Headrest 200 attaches to headrest bracket 210. Headrest bracket 210 is connected to pitch rotational assembly 300. Pitch to horizontal connector plate 340 connects pitch rotational assembly 300 to horizontal linear translation assembly 400. Horizontal to yaw connector plate 440 connects to horizontal linear assembly 400 to yaw rotational assembly 600. Yaw to vertical connector plate 640 connects yaw rotational assembly 600 to vertical linear translation assembly 500. Mounting plate 100 connects vertical linear translation assembly 500 to the wheelchair. Mounting plate 100 utilizes a two-bolt hole design and can be easily replaced with a different mounting plate if needed for attachment to the wheelchair.

Pitch rotational assembly 300 provides movement of headrest 200 around an axis perpendicular to the headrest's forward position. Horizontal linear translation assembly 400 provides movement of headrest 200 in a direction in line with the headrest's forward motion. Vertical linear translation assembly 500 provides movement of headrest 200 in a vertical direction. Yaw rotational assembly 600 provides movement of headrest 200 around a vertical axis, allowing the headrest user to turn headrest 200 to the left or to the right.

FIG. 2A-B is a close-up view of pitch rotational assembly 300. Pitch rotational mechanical actuator 310 provides the force to move headrest 200 around an axis perpendicular to the headrest's forward position. Pitch rotational assembly 300 is configured to provide about 135° motion in either direction from the manual starting position, allowing for about 270° motion about the axis perpendicular to the headrest's forward position.

Further included in pitch rotational assembly 300 are pitch manual adjustment position bolt apertures 320 which provide the headrest user with manual starting positions of headrest 200 at different angles around the axis perpendicular to the headrest's forward position. Pitch to horizontal connector plate 340 allows pitch rotational assembly 300 to be statically connected horizontal linear translation assembly 400.

FIG. 2C-D is a close-up view of horizontal linear translation assembly 400. Horizontal linear translation assembly 400 includes horizontal linear mechanical actuator 410, which provides the force to move headrest 200 back and forth in a horizontal direction in line with the headrest's forward position. Horizontal linear mechanical actuator 410 provides this force by expanding and retracting horizontal linear piston 430. Horizontal linear translation assembly 400 is kept in line by horizontal slider track 420. Horizontal to yaw connector plate 440 allows horizontal linear translation assembly 400 to be statically connected to yaw rotational assembly 600.

Figures 2E, 2F:
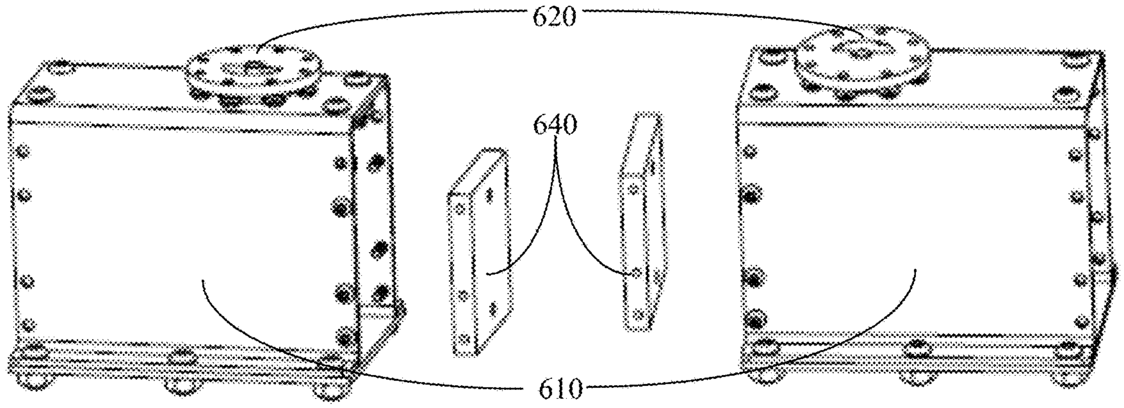
FIG. 2E depicts a left side view of an embodiment of the yaw rotational mechanical actuator attached to the yaw manual adjustment bolt apertures and the yaw to vertical connector plate.
FIG. 2F depicts a right side view of an embodiment of the yaw rotational mechanical actuator attached to the yaw manual adjustment bolt apertures and the yaw to vertical connector plate.

FIG. 2E-F is a close-up view of yaw rotational assembly 600. Yaw rotational mechanical actuator 610 provides the force to move headrest 200 around a vertical axis. Yaw rotational assembly 600 is configured to provide 180° motion in either direction from the manual starting position, allowing the user to turn headrest 200 360° around the vertical axis. Further included in yaw rotational assembly 600 is yaw manual adjustment bolt apertures 620 which provide the headrest user with manual starting positions of headrest 200 at different angles around the vertical axis. Yaw to vertical connector plate 640 allows yaw rotational assembly 600 to be statically connected vertical linear translation assembly 500.

Figures 2G, 2H:
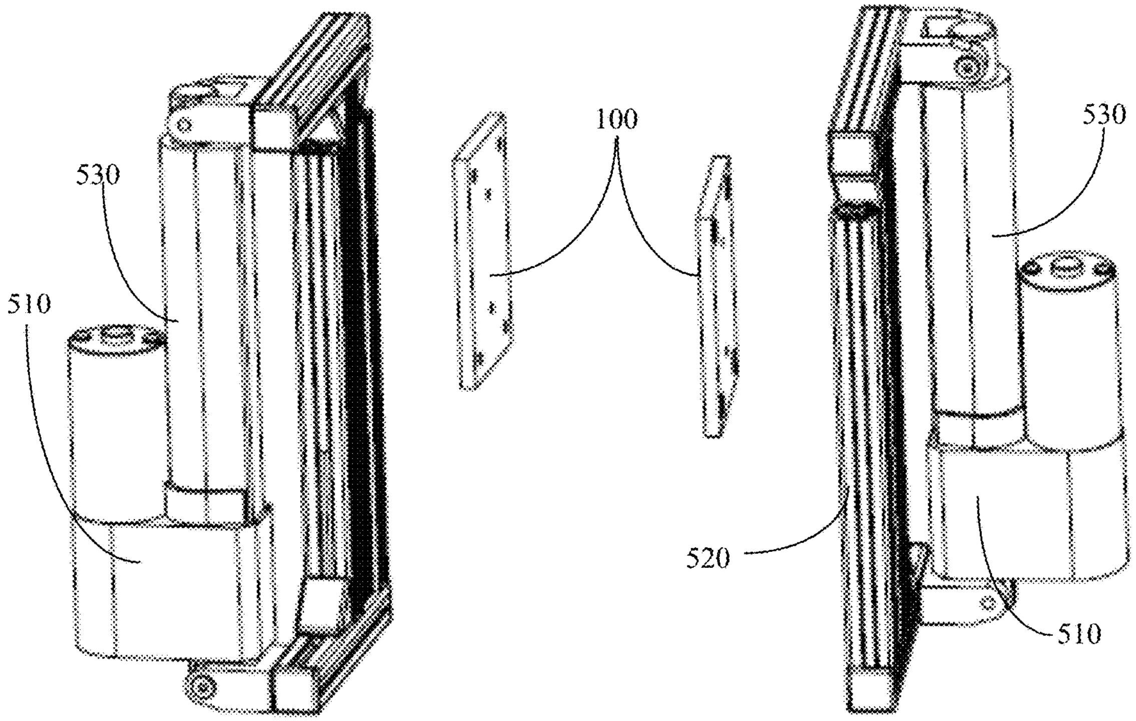
FIG. 2G depicts a left side view of an embodiment of the vertical linear mechanical actuator attached to the vertical linear piston and the mounting plate.
FIG. 2H depicts the right side view of an embodiment of the vertical linear mechanical actuator attached to the vertical linear piston, the vertical slider track, and the mounting plate.

FIG. 2G-H is a close-up view of vertical linear translation assembly 500. Vertical linear translation assembly 500 includes vertical linear mechanical actuator 510, which provides the force to move headrest 200 up and down in a vertical direction. Vertical linear mechanical actuator provides this force by expanding and retracting vertical linear piston 530. Vertical linear translation assembly 500 is kept in line vertically by vertical slider track 520. Mounting plate 100 allows vertical linear translation assembly 500 to be statically connected to the back of the wheelchair.

Figure 3A:
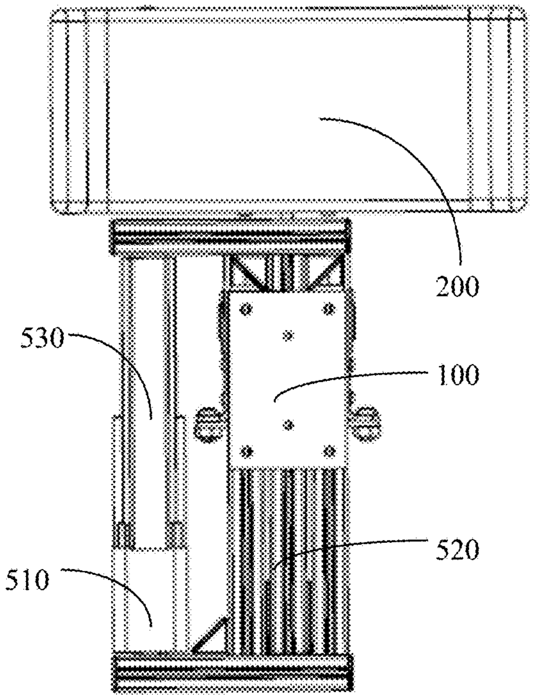
FIG. 3A depicts a front view of an embodiment of the wireless adjustable wheelchair headrest.

FIG. 3A depicts a front view of the adjustable wheelchair headrest, which includes headrest 200 and mounting plate 100. Mounting plate 100 is manually adjustable up or down in a vertical direction. The placement of mounting plate 100 does not interfere with the ability of vertical linear mechanical actuator 510 to fully extend or fully retract vertical linear piston 530.

Figure 3B:
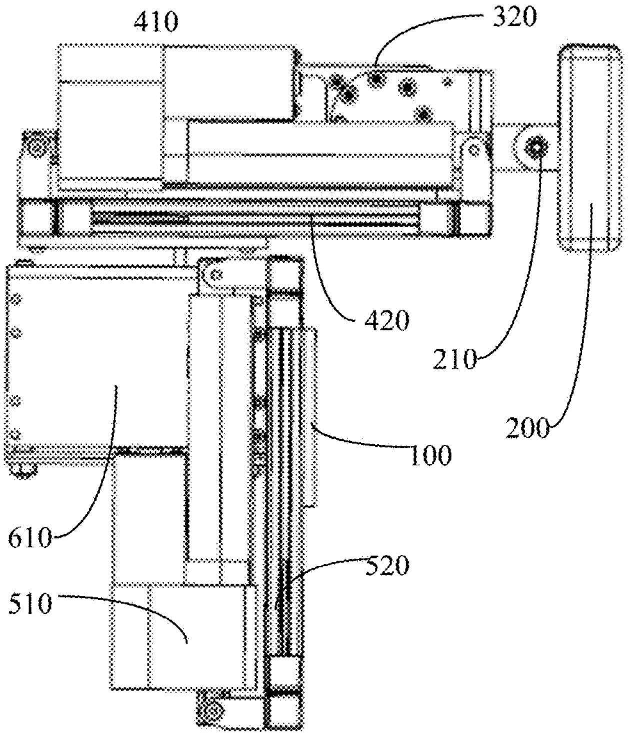
FIG. 3B depicts a side view of an embodiment of the wireless adjustable wheelchair headrest.

FIG. 3B depicts a side view of the adjustable wheelchair headrest. Headrest 200 is attached to headrest bracket 210. Headrest bracket 210 is connected to pitch rotational assembly 300. Horizontal to yaw connector plate 440 connects to horizontal linear translation assembly 400 to yaw rotational assembly 600. Pitch rotational assembly 300 is configured to attach to pitch to horizontal connector plate 340 (not shown). Pitch rotational assembly 300 includes pitch manual adjustment position bolt apertures 320, which allow headrest 200 to be rotated around the axis perpendicular to the headrest forward position. Horizontal linear mechanical actuator 410 provides a linear force along the headrest's forward position, allowing the headrest user to move headrest 200 back and forth along an axis in line with the headrest's forward position. Horizontal linear assembly 400 is kept in line by horizontal slider track 420. Mounting plate 100 is configured to attach to the back of a wheelchair. Vertical linear mechanical actuator 510 provides a linear force in the vertical direction, allowing the headrest user to move headrest 200 up and down along a vertical axis. Vertical linear assembly 500 is kept in line vertically by vertical slider track 520. Yaw rotational assembly 600 provides rotational movement around the vertical axis. Yaw rotational mechanical actuator 610 provides the force to move headrest 200 around the vertical axis.

Figure 3C:
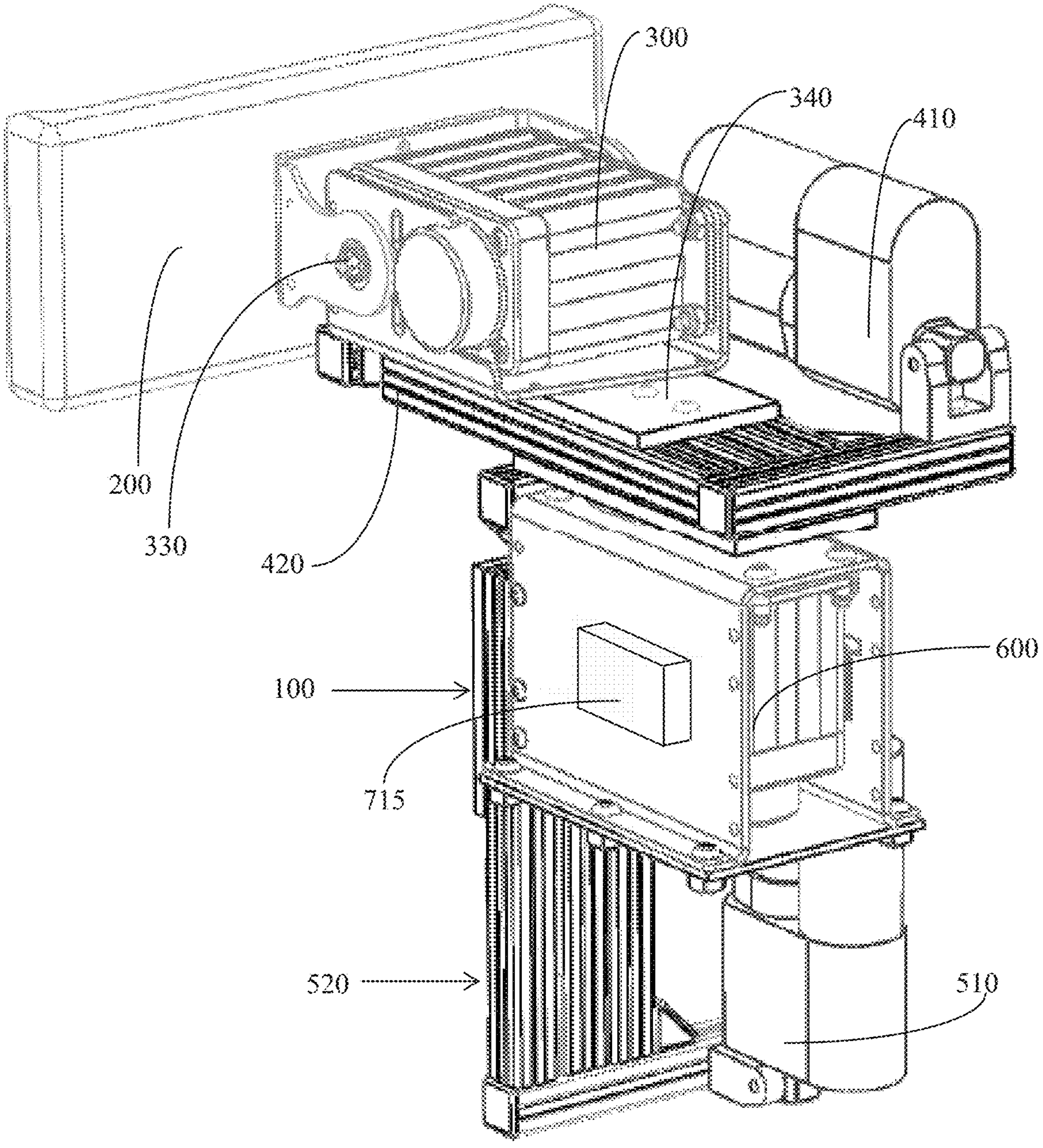
FIG. 3C depicts an angled view of an embodiment of the wireless adjustable wheelchair headrest.

As shown in FIG. 3C, headrest 200 can be moved back and forth in a horizontal direction generally aligned with the headrest's forward position, up and down in a vertical direction, rotationally around the vertical axis, and rotationally around an axis perpendicular to the headrest's forward direction. Pitch rotational point 330 is the rotational area of headrest 200 around the horizontal axis perpendicular to the headrest's forward position. Pitch rotational assembly 300 is configured to attach to pitch to horizontal connector plate 340. Horizontal linear mechanical actuator 410 provides movement of the headrest in line with the headrest's forward position. This movement is kept in line by horizontal slider track 420. Horizontal to yaw connector plate 440 is attached to yaw rotational assembly 600. Yaw rotational assembly 600 provides rotational movement about the vertical axis. Vertical linear mechanical actuator 510 provides up and down movement of headrest 200 in the vertical direction. The vertical movement is kept in line by vertical slider track 520. Mounting plate 100 is attached to yaw manual adjustment bolt apertures 620 and to the back of the wheelchair.

FIG. 4A-H are shown to demonstrate different positions of headrest 200 due to the linear and rotational mechanical actuators and the manual adjustable starting positions in the pitch and yaw directions.

Figure 4A:
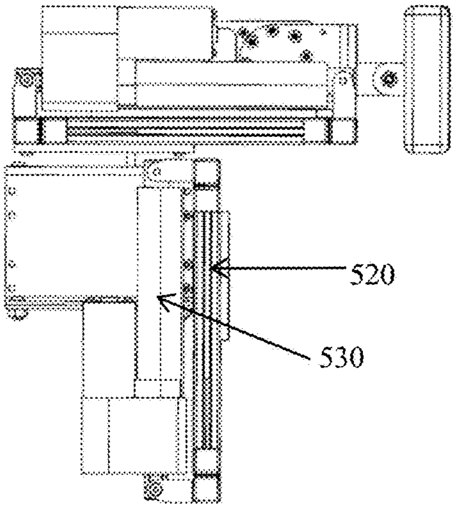
FIG. 4A depicts the minimum vertical height of an embodiment of the wireless adjustable wheelchair headrest due to the movement produced by the vertical linear mechanical actuator from a side view.
Figure 4B:
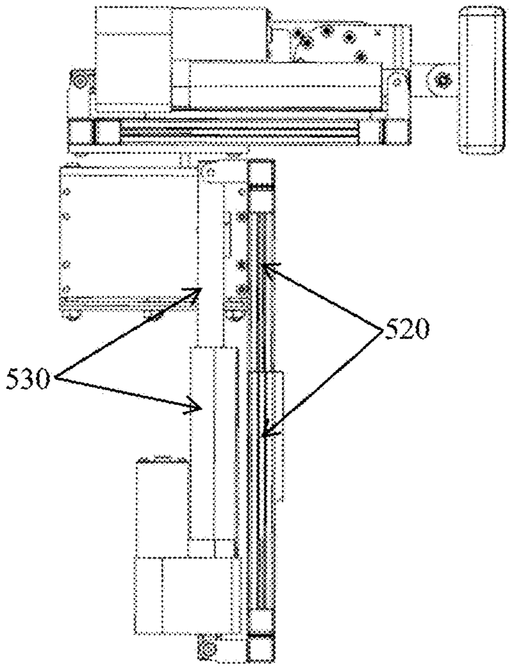
FIG. 4B depicts the maximum vertical height of an embodiment of the wireless adjustable wheelchair headrest due to the movement produced by the vertical linear mechanical actuator from a side view.

In FIG. 4A, vertical slider track 520 and vertical linear piston 530 are shown in their retracted or minimum vertical height positions. In FIG. 4B, vertical slider track 520 and vertical linear piston 530 are shown in their fully extended or maximum vertical height positions. Users of the controlling device 800 may instruct the actuator controller 715 to cause horizontal linear mechanical actuator 410 to provide movement of headrest 200 to either of the positions shown in FIGS. 4A and 4B. Users of the controlling device 800 may also instruct the actuator controller 715 to cause the horizontal linear mechanical actuator to provide movement of headrest 200 to any position in between and including the minimum and maximum vertical height positions shown in FIGS. 4A and 4B.

Figure 4C:
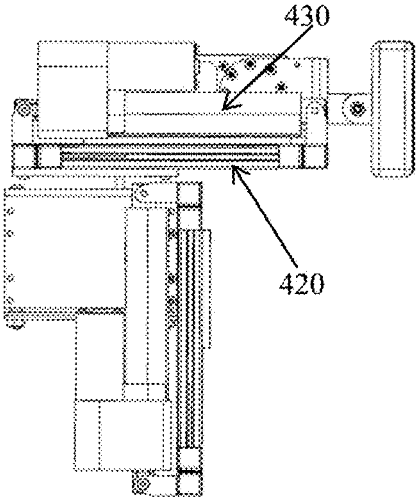
FIG. 4C depicts the minimum forward motion of an embodiment of the wireless adjustable wheelchair headrest due to the movement produced by the horizontal linear mechanical actuator from a side view.
Figure 4D:
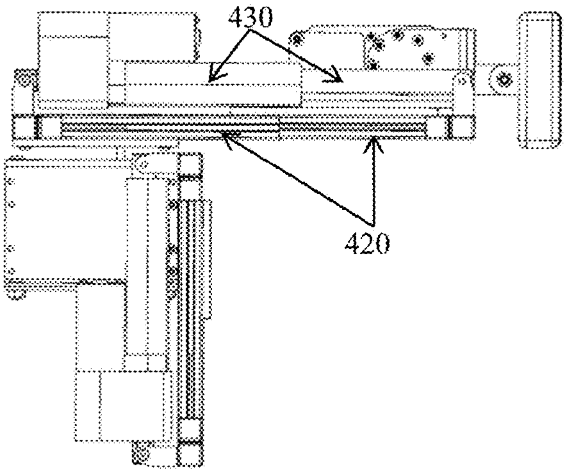
FIG. 4D depicts the maximum forward motion of an embodiment of the wireless adjustable wheelchair headrest due to the movement produced by the horizontal linear mechanical actuator from a side view.

In FIG. 4C, horizontal slider track 420 and horizontal linear piston 430 are shown in their retracted or minimum horizontal placement positions. In FIG. 4D, horizontal slider track 420 and horizontal linear piston 530 are shown in their fully extended or maximum horizontal placement positions. Users of the controlling device 800 may instruct the actuator controller 715 to cause vertical linear mechanical actuator 510 to provide movement of headrest 200 to either of the positions shown in FIGS. 4C and 4D. Users of the controlling device 800 may also control the actuator controller 715 to cause vertical linear mechanical actuator 510 to provide movement of headrest 200 to any position in between and including the minimum and maximum horizontal placement positions shown in FIGS. 4C and 4D.

Figure 4E:
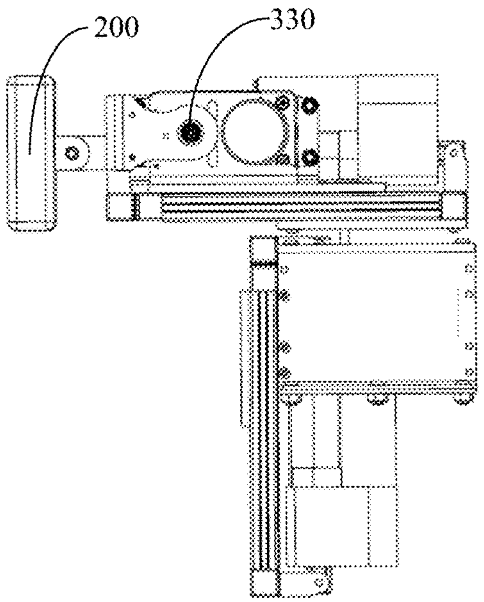
FIG. 4E depicts the starting position of an embodiment of the wheelchair headrest from a side view.
Figure 4F:
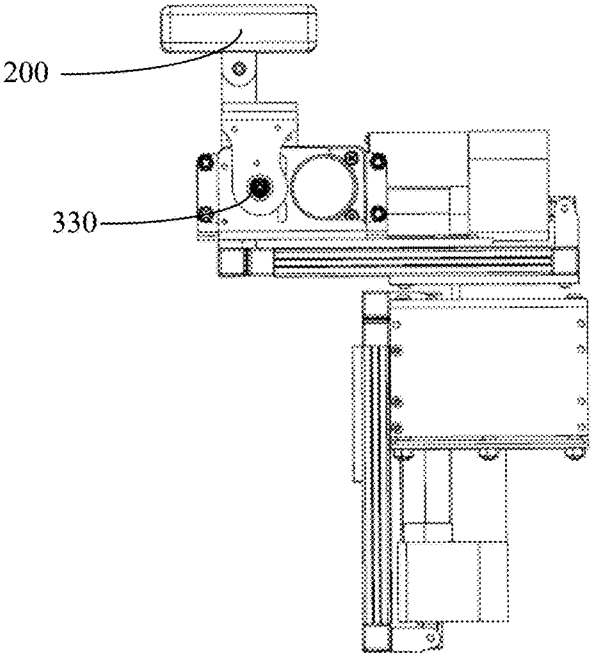
FIG. 4F depicts 90° rotation in the clockwise direction around a horizontal axis of an embodiment of the adjustable wheelchair headrest due to the movement produced by the pitch rotational mechanical actuator from a side view.

In FIG. 4E, headrest 200 is shown in a conventional forward position. In FIG. 4F, headrest 200 is shown at a 90° angle in a clockwise direction with respect to the conventional forward position of FIG. 4E. Headrest 200 rotates about pitch rotational point 330. Users of the controlling device 800 may command the actuator controller 715 to cause pitch rotational mechanical actuator 310 to provide motion to headrest 200 around the horizontal axis perpendicular to the headrest's forward position. Pitch rotational mechanical actuator 310 may provide movement of headrest 200 about 135° in a clockwise direction and about 135° in a counterclockwise direction for a range of about 270° of movement around pitch rotational point 330. Most users will not need this much range of motion and lesser ranges of motion may be programmed into the actuator controller 715. However, it can be imagined that the device may be attached to non-traditional chairs that may require more ranges of motion.

Furthermore, pitch manual adjustment bolt apertures 320, as shown in FIG. 2A, can be utilized to allow headrest 200 to be manually placed in a customizable pitch starting position. Pitch manual adjustment bolt apertures 320 provide headrest 200 a 360° range of pitch starting positions. This manual adjustability is in addition to the range of motion provided by pitch rotational mechanical actuator 310.

Figure 4G:
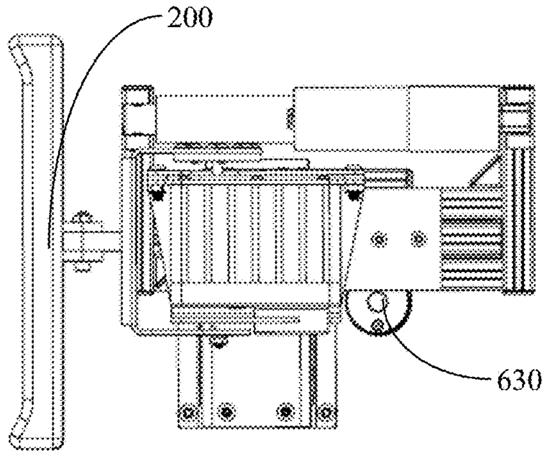
FIG. 4G depicts 90° rotation in the counterclockwise direction around a vertical axis of an embodiment of the adjustable wheelchair headrest due to the movement produced by the yaw rotational mechanical actuator from an overhead view.
Figure 4H:
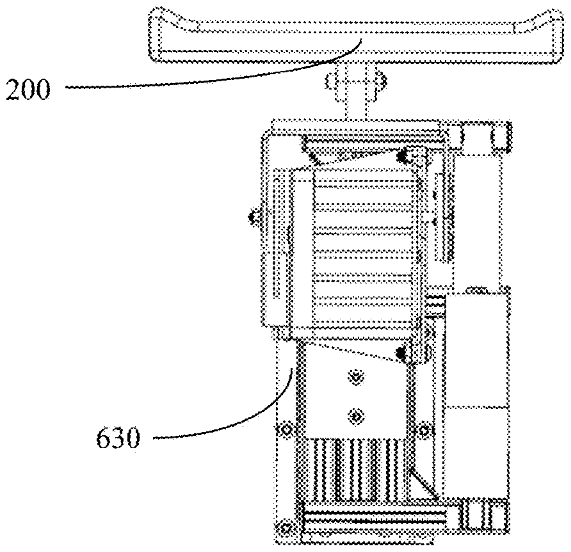
FIG. 4H depicts the starting position of an embodiment of the adjustable wheelchair from a top down view.

In FIG. 4G, headrest 200 is shown from an overhead view at a 90° angle in a counterclockwise direction to the headrest's forward position. In FIG. 4F, headrest 200 is shown in a conventional forward position. Referring back to FIG. 4G, headrest 200 rotates about yaw rotational disc 630. Users of the device may use the actuator controller 715 to cause yaw rotational mechanical actuator 610 to provide motion to headrest 200 around the vertical axis. Yaw rotational mechanical actuator 610 may provide movement of headrest 200 about 18° in a clockwise direction and about 180° in a counterclockwise direction for a range of about 360° of movement around yaw rotational disc 630. Most users will not need this much range of motion and lesser ranges of motions may be programmed into the actuator controller 715. However, it can be imagined that the device may be attached to non-traditional chairs that may require more ranges of motion.

Furthermore, yaw manual adjustment bolt apertures 620, as shown in FIG. 2E-F, can be utilized to allow headrest 200 to be manually placed in a customizable yaw starting position. Yaw manual adjustment bolt apertures 620 provides headrest 200 a 360° range of yaw starting positions. This manual adjustability is in addition to the range of motion provided by yaw rotation mechanical actuator 610.

FIG. 5A-D are shown to demonstrate different positions of headrest 200 due to the manual adjustable starting positions in the linear directions.

Figure 5A:
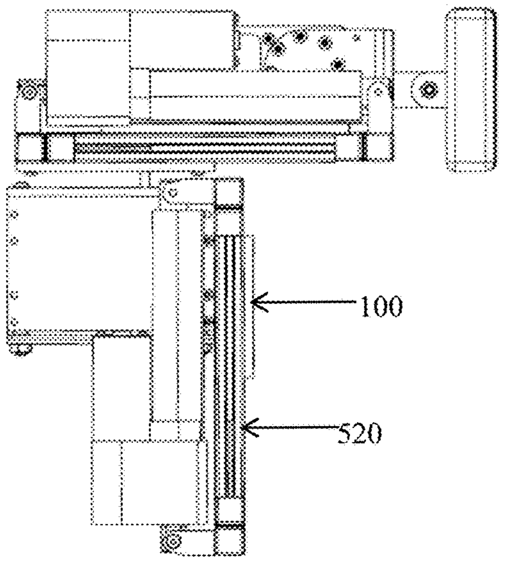
FIG. 5A depicts a first manual starting position of an embodiment of the wireless adjustable wheelchair headrest due to the placement of the mounting plate.
Figure 5B:
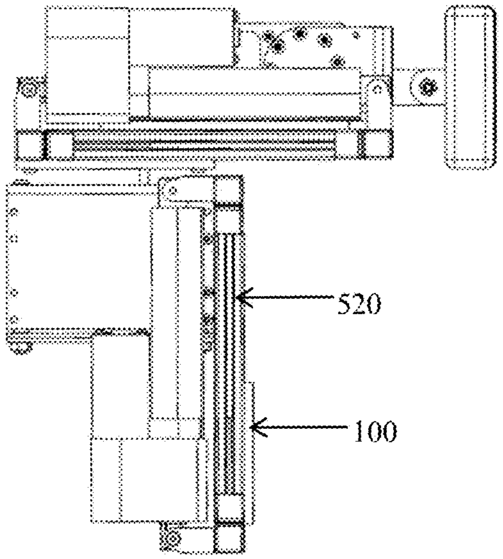
FIG. 5B depicts a second manual starting position of an embodiment of the wireless adjustable wheelchair headrest due to the placement of the mounting plate.

FIG. 5A shows the manual starting position of mounting plate 100 in a higher vertical position with respect to vertical slider track 520. FIG. 5B shows the manual starting position of mounting plate 100 in a lower vertical position with respect to vertical slider track 520. As mounted in FIG. 5A, headrest 200 would be lower in a vertical direction with respect to the wheelchair. As mounted in FIG. 5B, headrest 200 would be higher in a vertical direction with respect to the wheelchair. Mounting plate 100 may be manually mounted to the wheelchair in any position between the positions shown in FIGS. 5A and 5B. The decision of where to position mounting plate 100 depends on the wheelchair user's preference of headrest's 200 starting vertical position.

Figure 5C:
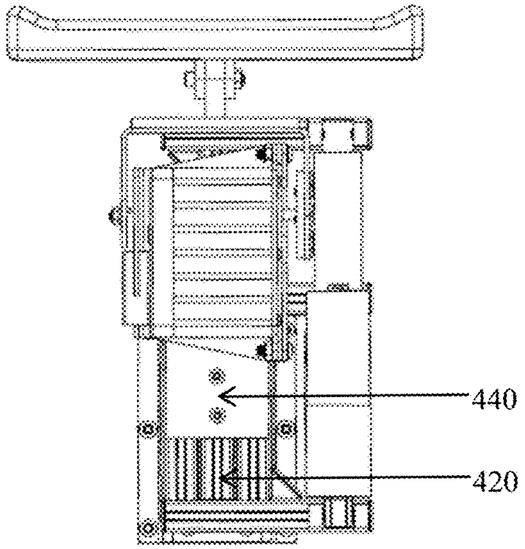
FIG. 5C depicts a first manual starting position of an embodiment of the wireless adjustable wheelchair headrest due to the placement of the horizontal bolt plate.
Figure 5D:
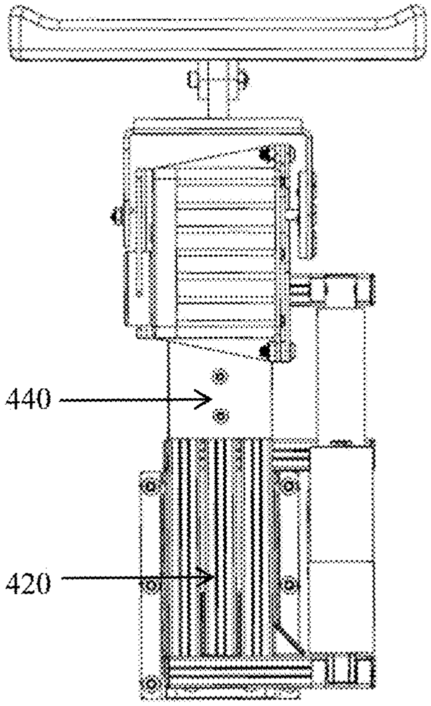
FIG. 5D depicts a second manual starting position of an embodiment of the wireless adjustable wheelchair headrest due to the placement of the horizontal bolt plate.

FIG. 5C shows the manual starting position of pitch to horizontal connector plate 340 in a distal horizontal direction with respect to the headrest user on horizontal slider track 420. FIG. 5D shows the manual starting position of pitch to horizontal connector plate 340 in a proximal horizontal direction with respect to the headrest user on horizontal slider track 420. As mounted in FIG. 5C, headrest 200 would be further back in a direction from the headrest's forward position. As mounted in FIG. 5D, headrest 200 would be more forward in a direction from the headrest's forward position. Pitch to horizontal connector plate 340 may be manually mounted along horizontal slider track 420 in any position between the positions shown in FIGS. 5C and 5D. The decision of where to position pitch to horizontal connector plate 340 depends on the wheelchair user's preference of headrest's 200 starting horizontal position.

Figure 6:
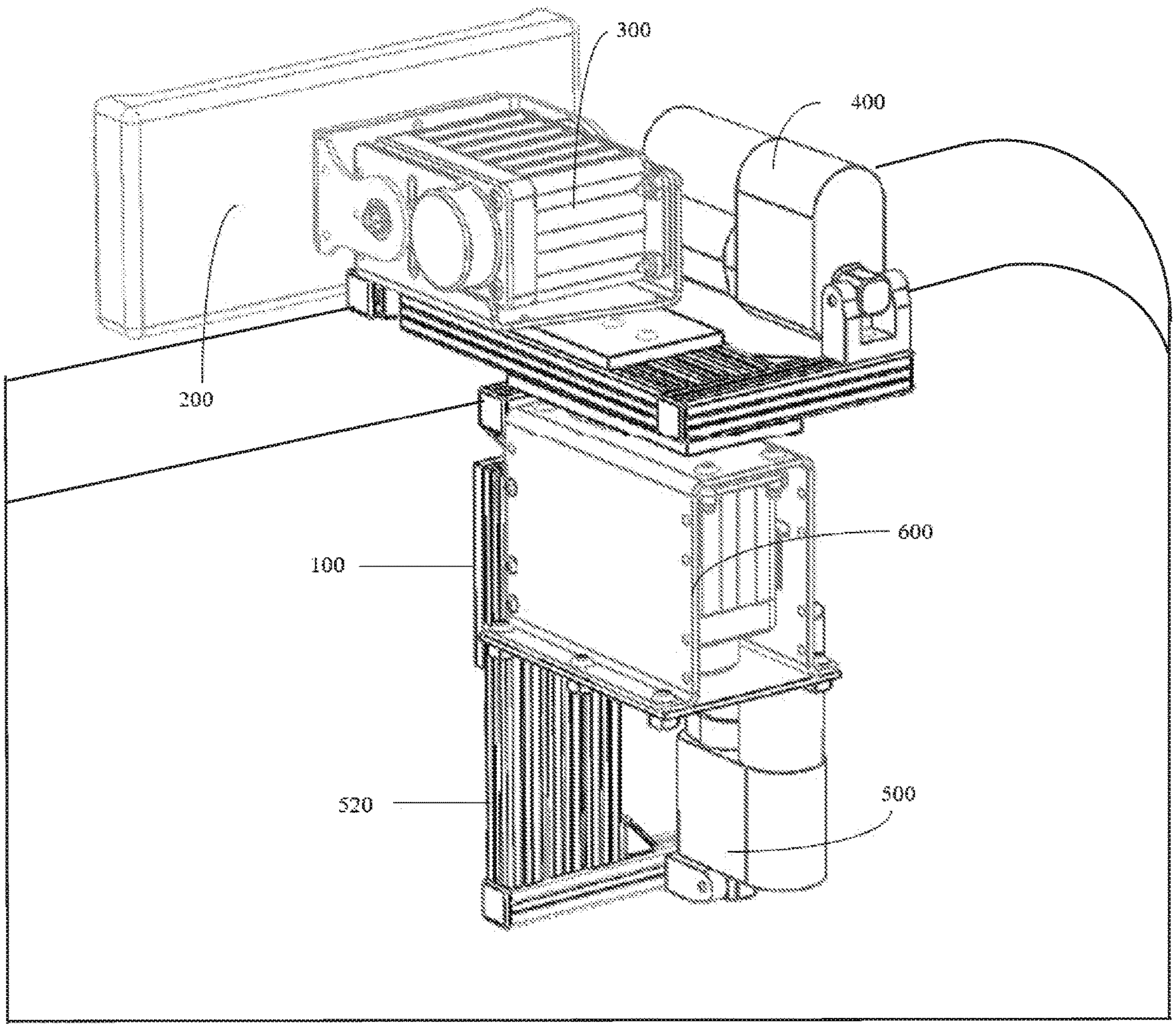
FIG. 6 depicts an embodiment of the wireless adjustable wheelchair headrest attached to a wheelchair.

FIG. 6 shows the device attached to the back of a wheelchair by mounting plate 100. Mounting plate 100 is positioned at a lower vertical position with respect to vertical slider track 520, resulting in a maximum manual adjustment vertical height of headrest 200. However, mounting plate 200 could be positioned higher vertically on the back of the wheelchair and in the same position with respect to vertical slider track 520 to raise headrest 200 higher in the vertical direction. Furthermore, vertical linear assembly 500, horizontal linear assembly 400, pitch rotational assembly 300, and yaw rotational assembly 600 are in their retracted or minimum starting positions and can still provide adjustability in their respective directions.

Glossary of Claim Terms

Pitch: is the rotation of the headrest around a horizontal axis perpendicular to the forward-facing position of the headrest.

Yaw: is the rotation of the headrest around a vertical axis.

Roll: is the rotation of the headrest around a horizontal axis in line with the forward-facing position of the headrest.

Controlling Device: is a mobile device, wireless remote, handheld computer device or any other controlling device known to a person of ordinary skill in the art.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An adjustable headrest system, comprising:

a headrest in connection with a linear translation assembly and a rotational assembly;

the translation adapted to adjust the headrest back and forth in a first linear direction;

the rotational assembly adapted to rotationally adjust the headrest around a horizontal axis perpendicular to a forward-facing surface of the headrest; and an actuator controller, wherein the actuator controller is in communication with the linear translation assembly and the rotational assembly and is accessible to a headrest user.

2. The adjustable headrest system of claim 1, further comprising an electrical connection attachable to a power source secured to a wheelchair.

3. The adjustable headrest system of claim 1, further comprising a detachable power source in temporary electrical communication with the adjustable headrest system.

4. The adjustable headrest system of claim 1, wherein the actuator controller is in wireless communication with a controlling device.

5. The adjustable headrest system of claim 4, wherein the controlling device includes an application configured to store a position of the headrest as a preset position for the headrest.

6. The adjustable headrest system of claim 1, further comprising a universally attachable mounting plate, wherein the mounting plate attaches to the back of a chair when the adjustable headrest system is secured to said chair.

7. The adjustable headrest system of claim 1, wherein the linear translation assembly translates the headrest in a linearly vertical direction.

8. The adjustable headrest system of claim 1, wherein the linear translation assembly translates the headrest in a linearly horizontal direction.

9. The adjustable headrest system of claim 1, wherein a second rotational translation assembly rotates the headrest a horizontal axis parallel with the forward-facing surface of the headrest.

10. The adjustable headrest of claim 1, wherein each of the linear translation assembly and the rotational translation assembly are adapted to adjust their starting positions with respect to the adjustable headrest system.

11. An adjustable headrest system, comprising:

a headrest in connection with a linear translation assembly and a rotational assembly;

the translation adapted to adjust the headrest back and forth in a first linear direction;

the rotational assembly adapted to rotationally adjust the headrest around a first axis;

a universally attachable mounting plate, wherein the mounting plate is in mechanical communication with at least one of the linear translation assembly or the rotational assembly and the mounting plate is attachable to the back of a chair when the adjustable headrest system is secured to said chair; and an actuator controller, wherein the actuator controller is in communication with the linear translation assembly, and the rotational assembly and is accessible to a headrest user.

12. The adjustable headrest system of claim 11, wherein the actuator controller is in wireless communication with a controlling device.

13. The adjustable headrest system of claim 11, wherein the controlling device includes an application configured to store a position of the headrest as a preset position for the headrest.

14. The adjustable headrest system of claim 11, wherein the linear translation assembly translates the headrest in a linearly vertical direction.

15. The adjustable headrest system of claim 11, wherein the linear translation assembly translates the headrest in a linearly horizontal direction.

16. The adjustable headrest system of claim 11, wherein the rotational translation assembly rotates the headrest about a horizontal axis perpendicular to the forward-facing surface of the headrest.

17. The adjustable headrest system of claim 11, wherein the rotational translation assembly rotates the headrest around a vertical axis.

18. The adjustable headrest system of claim 11, wherein the rotational translation assembly rotates the headrest about a horizontal axis parallel with the forward-facing surface of the headrest.

19. The adjustable headrest of claim 11, wherein each of the linear translation assembly and the rotational translation assembly are adapted to adjust their starting positions with respect to the adjustable headrest system.

20. An adjustable headrest system, comprising:

a headrest in connection with a linear translation assembly and a rotational assembly;

the translation adapted to adjust the headrest back and forth in a first linear direction;

the rotational assembly adapted to rotationally adjust the headrest around a vertical axis; and an actuator controller, wherein the actuator controller is in communication with the linear translation assembly and the rotational assembly and is accessible to a headrest user.

* * * * *